E. CADY.
Carving-Fork.
No. 203,415. Patented May 7, 1878.
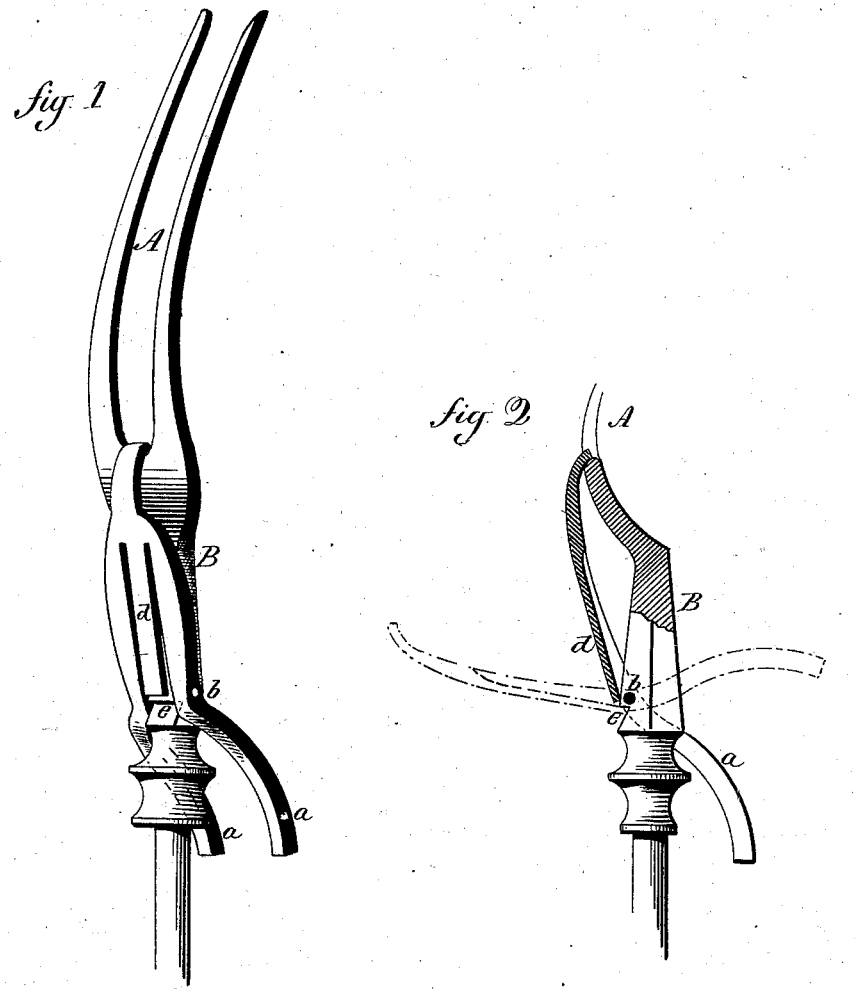
Witnesses
Edwin Cady
Inventor
By Atty.

UNITED STATES PATENT OFFICE.

EDWIN CADY, OF WEST MERIDEN, CONNECTICUT, ASSIGNOR TO MERIDEN CUTLERY COMPANY, OF SAME PLACE.

IMPROVEMENT IN CARVING-FORKS.

Specification forming part of Letters Patent No. 203,415, dated May 7, 1878; application filed April 19, 1878.

*To all whom it may concern:*

Be it known that I, EDWIN CADY, of West Meriden, in the county of New Haven and State of Connecticut, have invented a new Improvement in Carving-Forks; and I do hereby declare the following, when taken in connection with the accompanying drawings and the letters of reference marked thereon, to be a full, clear, and exact description of the same, and which said drawings constitute part of this specification, and represent, in—

Figure 1, a perspective view; Fig. 2, section of the same.

This invention relates to an improvement in that class of guards for carving-forks which serve the purpose of both guard and rest; and it consists in the details of construction, as hereinafter described, and more particularly recited in the claim.

A represents the tines, and B the shank, of a carving-fork of substantially the usual construction. The guard consists of a bifurcated piece, with legs $a$, extending one each side the shank, and hinged thereto by a pintle, $b$. In the guard, on the upper side of the shank, a spring-tongue, $d$, is formed by slitting each side the tongue, and in length so as to extend to a point above the central line of the pivot, as seen in Fig. 2, and so as to bear upon the shank above the pivot, hence acting as a spring, and when in the closed position, as seen in Figs. 1 and 2, tends to hold the guard in that closed position.

Above the pivot a recess or shoulder, $c$, is formed, and in such relative position to the end of the tongue $d$ that, when the guard is raised, as in broken lines, Fig. 2, the tongue will ride over the shoulder into the notch, and, bearing against the shoulder, will hold the guard in its open position. But the holding of the guard in either of the two positions is such that it may easily be turned from one to the other, and that, as the guard approaches either of the two positions, the spring acts to force it into either of such positions. The shoulder need not be in the form of a notch, as shown, as a simple rib on the back of the shank will form the required shoulder.

I do not broadly claim a bifurcated guard and rest for carving-fork pivoted to the shank through the legs, as such I am aware is not new.

I claim—

The herein-described guard for carving-forks, consisting of the bifurcated piece, one leg extending each side of the shank and hinged thereto, combined with a spring-tongue in the guard and shoulder on the shank above the hinge, over which the said spring-tongue works, and so as to hold the guard in either its closed or open position, substantially as described.

EDWIN CADY.

Witnesses:
JOHN Q. THAYER,
ROBERT W. HALLAM.